(12) United States Patent
Nakamura

(10) Patent No.: US 12,525,814 B2
(45) Date of Patent: Jan. 13, 2026

(54) CONTROL DEVICE, POWER MANAGEMENT SYSTEM, AND CONTROL METHOD

(71) Applicant: TOYOTA JIDOSHA KABUSHIKI KAISHA, Toyota (JP)

(72) Inventor: Tohru Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 377 days.

(21) Appl. No.: 18/335,609

(22) Filed: Jun. 15, 2023

(65) Prior Publication Data

US 2024/0088695 A1     Mar. 14, 2024

(30) Foreign Application Priority Data

Sep. 8, 2022  (JP) ................. 2022-142903

(51) Int. Cl.
*H02J 7/00*     (2006.01)
*B60L 53/62*    (2019.01)

(52) U.S. Cl.
CPC .......... *H02J 7/00712* (2020.01); *B60L 53/62* (2019.02); *H02J 7/00032* (2020.01)

(58) Field of Classification Search
CPC ...... H02J 7/00712; H02J 7/00032; H02J 3/14; H02J 3/144; H02J 3/322; H02J 13/00001; H02J 13/00004; H02J 13/00016; H02J 13/00026; H02J 13/00036; B60L 53/62; B60L 53/63; B60L 53/00
See application file for complete search history.

(56) References Cited

U.S. PATENT DOCUMENTS

| | | | |
|---|---|---|---|
| 2017/0166063 A1* | 6/2017 | Cho | B60T 1/10 |
| 2021/0061129 A1* | 3/2021 | Nakamura | H01M 6/5038 |
| 2023/0120740 A1* | 4/2023 | Lewchuk | H02J 13/00002 |
| | | | 320/109 |

FOREIGN PATENT DOCUMENTS

| | | | | |
|---|---|---|---|---|
| CN | 113741674 A | * | 12/2021 | G06F 1/3212 |
| JP | 2012039832 A | * | 2/2012 | |
| JP | 2021-078310 A | | 5/2021 | |

* cited by examiner

*Primary Examiner* — Santosh R Poudel
(74) *Attorney, Agent, or Firm* — Finnegan, Henderson, Farabow, Garrett and Dunner, LLP

(57) ABSTRACT

The control device includes a charger to which electric power is distributed from the distribution board, an acquisition unit for acquiring power consumption of one or more electric devices, an instruction unit for instructing suppression of the charging operation of the charger in accordance with the power consumption based on an instruction authority of the charging operation for the charger, and a management unit for giving the instruction authority to the power management device that manages power demand using the charger when the power consumption is equal to or less than a first threshold, and giving the instruction authority to the instruction unit when the power consumption is greater than the first threshold.

9 Claims, 15 Drawing Sheets

CONTROL DEVICE, POWER MANAGEMENT SYSTEM, AND CONTROL METHOD

CROSS-REFERENCE TO RELATED APPLICATION

This application claims priority to Japanese Patent Application No. 2022-142903 filed on Sep. 8, 2022 incorporated herein by reference in its entirety.

BACKGROUND

1. Technical Field

The present disclosure relates to a control device, a power management system, and a control method.

2. Description of Related Art

As a technique for managing a balance between demand and supply of power by using a battery of a vehicle such as a battery electric vehicle as an electric storage device, vehicle grid integration (VGI) is mentioned. In VGI, a server called an aggregator controls charging and discharging of the battery of a consumer in accordance with a power generation state of a power company or the like.

Each consumer is provided with a charging facility for charging the battery (see, for example, Japanese Unexamined Patent Application Publication No. 2021-78310 (JP 2021-78310 A)). When the aggregator makes a request for increasing power demand to the consumer (so-called increased demand response (DR)), the aggregator instructs the charging facility to charge the battery via, for example, a home energy management system (HEMS) gateway installed by the consumer.

SUMMARY

However, when the power consumption of the consumer increases due to the use of high-load electric devices during the charging of the battery, a breaker may trip. The high-load electric devices include induction heating (IH) cookers, air conditioners, and the like. When the breaker trips, not only the charging is interrupted but also the use of the electric device is interrupted. This results in inconvenience. On the other hand, when the power consumption exceeds a threshold value, it is considered that the aggregator interrupts the charging. However, due to the time required for communication with the HEMS gateway, the timing of interrupting the charging may not be in time for tripping of the breaker.

The present disclosure has been made in view of the above issue, and an object of the present disclosure is to provide a control device, a power management system, and a control method capable of suppressing tripping of the breaker in the consumer.

A control device according to the present disclosure includes: an acquisition unit that acquires power consumption of a charger and one or more electric devices to which power is distributed from a distribution board;
an instruction unit that instructs, based on an instruction authority of a charging operation to the charger, suppression of the charging operation of the charger according to the power consumption; and
an management unit that executes
granting the instruction authority to a power management device that manages power demand using the charger, when the power consumption is equal to or less than a first threshold value, and
granting the instruction authority to the instruction unit, when the power consumption is greater than the first threshold value.

In the control device described above,
the instruction unit may instruct the charger to further suppress the charging operation when the power consumption is greater than a second threshold value that is greater than the first threshold value than when the power consumption is equal to or less than the second threshold value.

In the control device described above, the instruction unit may instruct the charger to stop the charging operation according to the power consumption.

In the control device described above, the acquisition unit may acquire the power consumption from a wire of the distribution board.

The control device described above may further include a control unit that reduces power of the one or more electric devices according to the power consumption, when the power consumption is greater than the first threshold value.

The control device described above may include:
a receiving unit that receives input of capacity of a main breaker of the distribution board from a user; and
a setting unit that sets the first threshold value based on the capacity of the main breaker.

In the control device described above, the acquisition unit may monitor a time change of the power consumption, and the setting unit may set the first threshold value based on a monitoring result of the time change of the power consumption and the capacity of the main breaker.

In the control device described above, the setting unit may change the first threshold value in accordance with a time based on the monitoring result of the time change of the power consumption.

In the control device described above, the setting unit may specify, from the monitoring result of the time change of the power consumption, a time period in which a time at which power consumption of any one of the one or more electric devices is maintained to a predetermined value or more is equal to or less a fixed value, and set the first threshold value according to a difference between the capacity of the main breaker and power consumption of an electric device in which the time at which the power consumption is maintained to the predetermined value or more is equal to or less than the fixed value, among the one or more electric devices, in the time period.

In the control device described above, the receiving unit may receive an input of a correction value of the first threshold value, and the setting unit may correct the first threshold value by the correction value.

The control device described above may include:
a receiving unit that receives input of capacity of a main breaker of the distribution board from a user; and
a setting unit that sets the second threshold value based on the capacity of the main breaker.

In the control device described above, the charger may charge a battery mounted on a vehicle.

In the control device described above, the power management device may increase power demand of a power grid to be supplied to the distribution board by instructing the charger to perform the charging operation.

A power management system according to the present disclosure includes:

a control device that controls a charger to which power is distributed from a distribution board; and a power management device that manages power demand using the charger, in which: the control device includes an acquisition unit that acquires power consumption of the charger and one or more electric devices to which the power is distributed from the distribution board, a first instruction unit that instructs, based on an instruction authority of a charging operation to the charger, suppression of the charging operation of the charger according to the power consumption, and a first management unit that executes granting the instruction authority to the power management device, when the power consumption is equal to or less than a first threshold value, and granting the instruction authority to the first instruction unit, when the power consumption is greater than the first threshold value; and the power management device includes a second instruction unit that instructs the charger to perform the charging operation via the control device based on the instruction authority, and a second management unit that executes acquiring the instruction authority from the first management unit and granting the instruction authority to the second instruction unit, and granting the instruction authority to the first management unit in response to a request from the first management unit.

In a control method according to the present disclosure, a computer executes processes including:

acquiring power consumption of a charger and one or more electric devices to which power is distributed from a distribution board;

instructing, based on an instruction authority of a charging operation to the charger, suppression of the charging operation of the charger according to the power consumption;

granting the instruction authority to a power management device that manages power demand using the charger, when the power consumption is equal to or less than a first threshold value; and acquiring the instruction authority from the power management device, when the power consumption is greater than the first threshold value.

According to the present disclosure, it is possible to suppress tripping of the breaker in the consumer.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Power Management System

Figure 1:
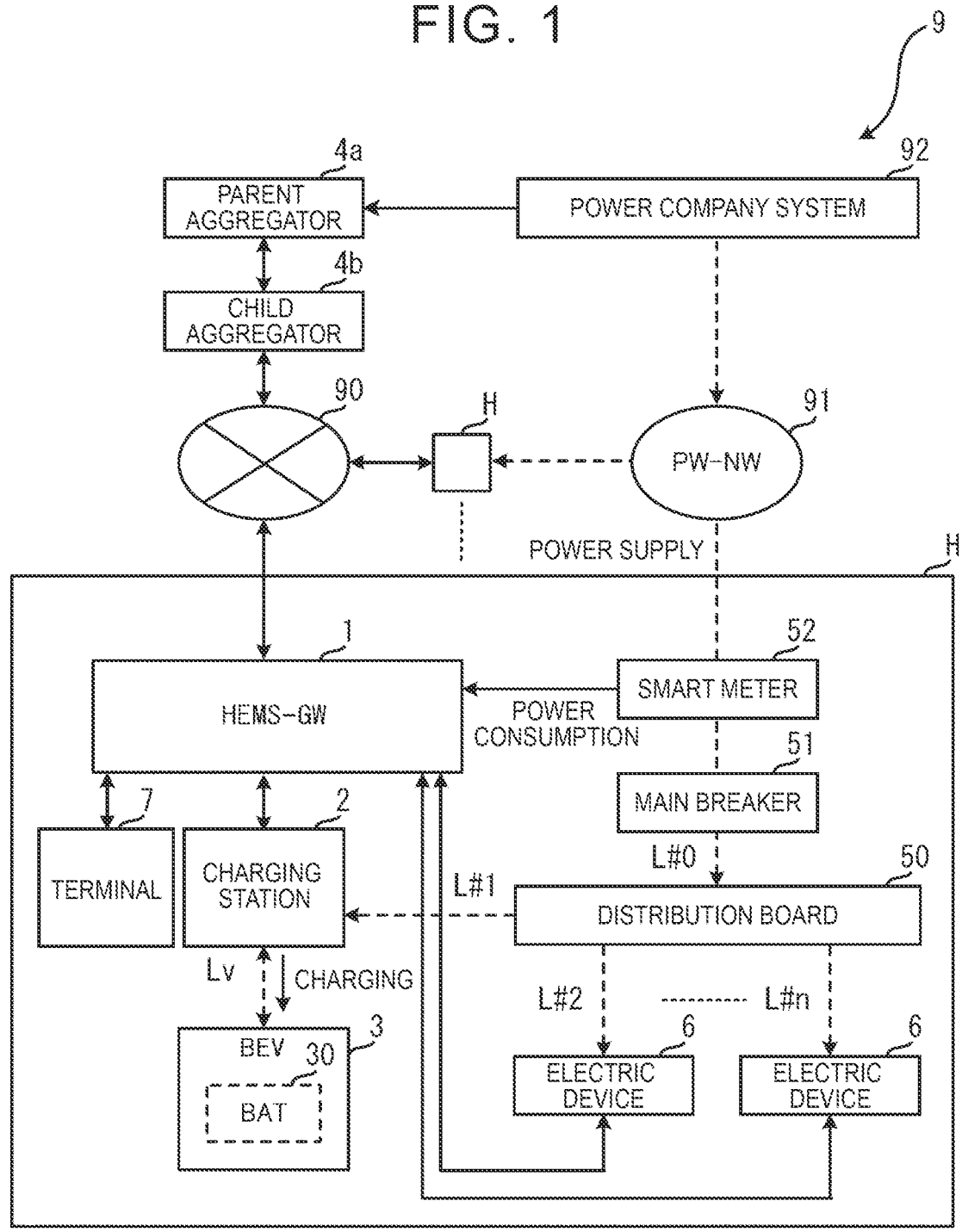
FIG. 1 is a configuration diagram schematically illustrating an example of a power management system.

FIG. 1 is a configuration diagram schematically illustrating an example of a power management system 9. A broken line in FIG. 1 indicates a wiring such as a power cable.

The power management system 9 includes a power company system 92, a parent aggregator 4a, a child aggregator 4b, and a consumer house H. The power company system 92 includes a plurality of servers and the like. The power company system 92 manages an electric power grid 91 that supplies electric power to each consumer house H. The electric power grid 91 includes various facilities and devices ranging from a power plant of an electric power company to a consumer house H. In addition, the power company system 92 requests electricity to be consumed or generated by the respective consumer houses H by VGI techniques. Accordingly, the power company system 92 manages the balance between the demand and the supply of electric power.

The parent-aggregator 4a and the child-aggregator 4b each include one or more servers. The parent aggregator 4a is connected to the child aggregator 4b and the power company system 92 via a dedicated communication line, e.g., Virtual Private Network (VPN). The parent aggregator 4a manages transactions of electric power, etc. The child aggregator 4b manages the power for the consumer house H. The child aggregator 4b is connected to the consumer house H via a communication line 90 such as the Internet. The child aggregator 4b is an exemplary power management device that manages power demand using the charging station 2.

The consumer house H includes a HEMS gateway (GW) 1, a charging station 2, a battery electric vehicle (BEV) 3, a distribution board 50, a main breaker 51, a smart meter 52, a plurality of electric devices 6, and a terminal 7. The electric power is supplied from a power plant of the electric power company to the consumer house H via the electric power grid 91. The electric power is distributed to the charging station 2 and the plurality of electric devices 6 via the distribution board 50. The plurality of electric device 6 includes, for example, an air conditioner and an IH cooker. The distribution board 50 is connected to the charging station 2 and the plurality of electric devices 6 via an L #n from a wire L #1. Further, the distribution board 50 is connected to the power grid 91 via a wire L #0. A smart meter 52 and a main breaker 51 are connected to the wire L #0.

The charging station 2 is an example of a charger. The charging station 2 charges a battery (a BAT) 30 provided in BEV 3. The charging station 2 is connected to the battery 30 via a charging cable Lv capable of communicating with a control device (not shown) of BEV 3. BEV 3 is an exemplary vehicle. The charging station 2 may charge the battery of hybrid electric vehicle instead of BEV 3.

Further, the distribution board 50 is provided with a main breaker 51. When the power consumption of the charging station 2 and the plurality of electric devices 6 connected to the distribution board 50 exceeds the capacity of the main breaker 51, the main breaker 51 trips. As a result, the power supply is cut off. Note that the capacity of the main breaker 51 may coincide with the power contracted by the consumer house H or may be inconsistent.

The smart meter 52 is provided on a wire L #0 extending from the power grid 91 to the distribution board 50. The smart meter 52 measures power consumed by the charging station 2 and the plurality of electric devices 6 connected to the distribution board 50 and notifies HEMS-GW 1 of the measured power consumed by the charging station. The smart meter 52 communicates with HEMS-GW 1 via a radio communication line such as a B-route. In addition, instead of the smart meter 52, HEMS-GW 1 may measure the power consumed by, for example, a power measuring instrument (not shown) connected to L #n from a wire L #1 connecting the distribution board 50, the charging station 2, and the plurality of electric devices 6. In this way, HEMS-GW 1 acquires the power consumed from L #n from the wire L #0 of the distribution board 50. Therefore, it is possible to obtain the power consumption more accurately than in the case where the power consumption is calculated from the usage conditions of the charging station 2 and the electric device 6, for example.

HEMS-GW 1 is an exemplary control device, and performs charge control of the charging station 2 and operation control of the electric device 6. HEMS-GW 1 communicates with the terminal 7 and the charging station 2 by radio communication such as Wi-Fi. The terminal 7 is, for example, a smartphone or a tablet terminal. The terminal 7 performs various settings for HEMS-GW 1, such as the scheduled use of the charging station 2 and the electric device 6 and the capacitance of the main breaker 51, in response to the user's manipulation.

However, when the charging station 2 is charging the battery 30 and the power consumption of the consumer house H increases due to the use of the other electric devices 6 under the same distribution board 50, the main breaker 51 may trip. When the main breaker 51 trips, not only the charging is interrupted but also the use of the electric device 6 is interrupted, which causes inconvenience. On the other hand, when the power consumption exceeds the threshold, it is conceivable that the child aggregator 4b suspends the charge. However, due to the time required for communication with HEMS-GW 1, the timing of stopping the charge may not be in time for tripping of the main breaker 51.

Therefore, when the power consumption acquired from the smart meter 52 is larger than the threshold value TH_L, HEMS-GW 1 acquires the instruction authority of the charging operation to the charging station 2 from the child aggregator 4b. HEMS-GW 1 suppresses the charging operation according to the power consumed based on the instruction authority. Here, the instruction authority suppresses the charging station 2 from being instructed to perform a plurality of charging at the same time. Therefore, only one of the child aggregator 4b and HEMS-GW 1 can be instructed to perform the charge operation. The presence or absence of the indication authority is determined by, for example, a value of a variable (for example, "0" is not authoritative, and "1" is authoritative).

HEMS-GW 1 suppresses the charging operation based on the instruction authority when the power consumption is larger than the threshold value TH_H (>TH_L) that is larger than the threshold value TH_L. The threshold value TH_L is determined in consideration of the capacity of the main breaker 51 and the power consumption of the electric device 6 under the distribution board 50. The threshold value TH_H is a value closer to the capacitance of the main breaker 51 than the threshold value TH_L, and is determined in consideration of a control error or the like. The threshold value TH_L is an example of the first threshold value. The threshold TH_H is an example of the second threshold.

Communication Sequence

Figure 2:
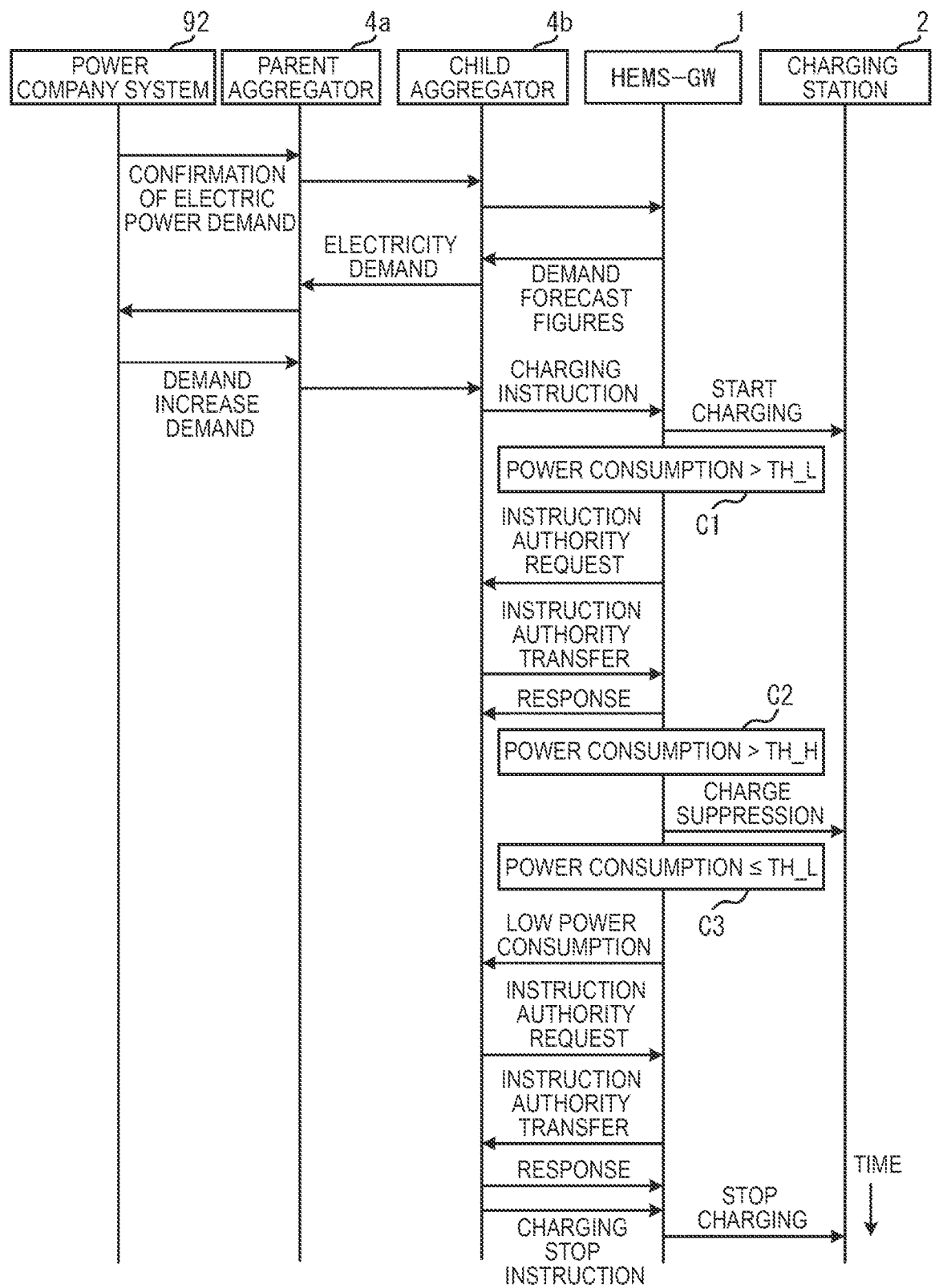
FIG. 2 is a sequence diagram illustrating an example of communication at the time of an increase in power demand in the power management system.

FIG. 2 is a sequence diagram illustrating an example of communication at the time of an increase in power demand in the power management system 9. First, the power management system 9 transmits a request for checking the demand of the power in the power grid 91. The request for checking the demand of the power reaches HEMS-GW 1 via the parent-aggregator 4a and the child-aggregator 4b.

HEMS-GW 1 predicts the demand from the charge schedule of the battery reserved by the terminal 7, for example, by the user. The demand forecast is notified to the child aggregator 4b. The child aggregator 4b calculates the demand power from the predicted demand values from the respective consumer houses H. The child aggregator 4b notifies the power company system 92 of the calculated demand power via the parent aggregator 4a. The power demand includes, for example, the power (kW) and the duration at which the power is used.

Next, the power company system 92 transmits a request (increased DR) for increasing the electric power demand based on the power demand check result. The request arrives at the child aggregator 4b via the parent aggregator 4a. In response to the request, the child aggregator 4b transmits an instruction to charge the battery 30 to HEMS-GW 1. That is, the child aggregator 4b instructs the charging station 2 to perform the charging operation, thereby increasing the power demand of the power grid 91. This allows the child aggregator 4b to balance the power demand of the power grid 91 to the power supplies. The charge instruction is issued based on the instruction authority described above. HEMS-GW 1 causes the charging station 2 to begin charging according to the instruction. HEMS-GW 1 also starts acquiring power consumed by the smart meter 52.

When the power consumed exceeds the threshold value TH_L (code C1), HEMS-GW 1 requests an indication authority from the child aggregator 4b. The child aggregator 4b transitions the instruction authority to HEMS-GW 1 on demand. When HEMS-GW 1 obtains the instruction authority from the child aggregator 4b, it returns the reply to the child aggregator 4b.

Thus, if the power dissipation is greater than the thresholds TH_L, HEMS-GW 1 obtains the indication authority from the child aggregator 4b. Therefore, HEMS-GW 1 is ready to instruct the charging station 2 in advance prior to the consumed power exceeding the capacity of the main breaker 51.

Next, when the power consumption acquired from the smart meter 52 exceeds the threshold value TH_H (code C2), HEMS-GW 1 instructs the charging station 2 to suppress the charging operation based on the instruction authority. Accordingly, the charging operation is suppressed before the power consumption reaches the capacity of the main breaker 51. Then, during the charge of the battery 30 in BEV 3, the trip of the main breaker 51 is suppressed. At this time, HEMS-GW 1 may instruct to decrease the charging rate, or may instruct to stop charging. When HEMS-GW 1 instructs to stop the charging, it is possible to reliably suppress the trip of the main breaker 51 than when HEMS-GW 1 instructs to decrease the charging rate.

Next, when the power consumption acquired from the smart meter 52 drops below the threshold value TH_L (code C3) due to the suppression of the charging operation, HEMS-GW 1 notifies the child aggregator 4b of the reduction in the power consumption. In response to the notification, the child aggregator 4b requests the indication authority from HEMS-GW 1.

HEMS-GW 1 transfers the indication authority to the child aggregator 4b in response to a request from the child aggregator 4b. When the child aggregator 4b obtains the instruction authority from HEMS-GW 1, it returns the reply to HEMS-GW 1.

The child aggregator 4b then sends an indication to HEMS-GW 1 of stopping the charge. HEMS-GW 1 controls the charging station 2 to stop charging.

Configuring HEMS-GW

Figure 3:
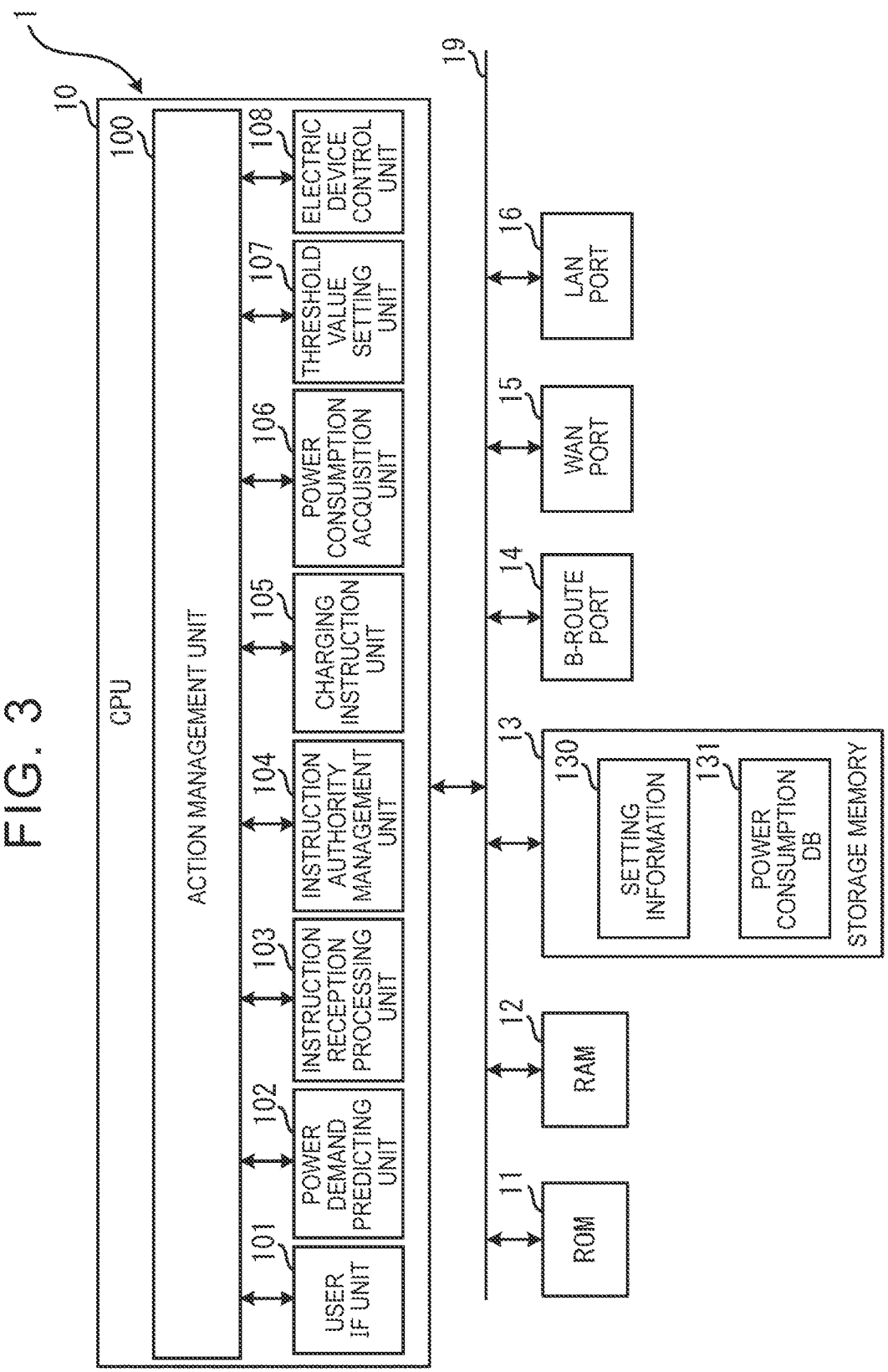
FIG. 3 is a configuration diagram illustrating an exemplary HEMS gateway.

FIG. 3 is a configuration diagram illustrating an exemplary HEMS-GW 1. HEMS-GW 1 is an exemplary computer. HEMS-GW 1 has a Central Processing Unit (CPU) 10, Read Only Memory (ROM) 11, Random Access Memory (RAM) 12, a storage memory 13, a B-route port 14, a Wide Area Network (WAN) port 15, and a Local Area Network (LAN) port 16. CPU 10 is electrically connected to ROM 11, RAM 12, the storage memory 13, the B-route port 14, WAN port 15, and LAN port 16 via the buss 19 so as to be able to input and output signals to and from each other.

ROM 11 stores a program for driving CPU 10. RAM 12 functions as a working memory of CPU 10. The B-route port 14, WAN port 15, and LAN port 16 include communication process circuitry and the like. The B-route port 14 handles communication with the smart meter 52. The B-route port 14 handles communication with the child aggregator 4b by WAN port 15. The B-route port 14 handles communication with the terminal 7 and the charging station 2 through LAN port 16.

When CPU 10 reads a program from a ROM 11, it forms an operation management unit 100, a user interface (user IF) unit 101, a power demand predicting unit 102, an instruction reception processing unit 103, an instruction authority management unit 104, a charging instruction unit 105, a power-consumption acquisition unit 106, a threshold value setting unit 107, and an electric device control unit 108 as software functions. In addition, the storage memory 13 stores setting information 130 and a power consumption data base (power consumption DB) 131. The storage memory 13 may be, for example, a flash memory, but is not limited thereto.

The operation management unit 100 controls operations of the user IF unit 101, the power demand predicting unit 102, the instruction reception processing unit 103, the instruction authority management unit 104, the charging instruction unit 105, the power-consumption acquisition unit 106, the threshold value setting unit 107, and the electric device control unit 108 based on a predetermined sequence.

The user IF unit 101 communicates with the terminal 7 via LAN port 16. The user IF unit 101 is an exemplary receiving unit, and receives input of various types of setting information 130 from the terminal 7. The setting information 130 includes, for example, the capacity of the main breaker 51, the scheduled use time of the charging station 2, and the scheduled use time of the electric device 6. The user IF unit 101 stores the setting information 130 in the storage memory 13.

The power demand predicting unit 102 predicts the power demand in the consumer house H from, for example, the scheduled use time of the charging station 2 in the setting information 130. The power demand predicting unit 102 transmits a predicted value of the power demand to the child aggregator 4b via WAN port 15 in response to the confirmation of the power demand from the power company system 92.

When the instruction reception processing unit 103 receives the charging instruction from the child aggregator 4b via WAN port 15, the instruction reception processing unit 103 processes the charging instruction. The instruction reception processing unit 103 confirms whether or not the child aggregator 4b has the instruction authority with respect to the authority management unit. When the child aggregator 4b has the instruction authority, the instruction reception processing unit 103 executes the charging instruction to the charging station 2 via LAN port 16. When the child aggregator 4b does not have the instruction authority, the instruction reception processing unit 103 does not execute the charge instruction.

The charging instruction unit 105 is an example of an instruction unit and a first instruction unit. The charging instruction unit 105 instructs the charging station 2 to perform a charging operation based on the instruction authority via LAN port 16. When the power consumption acquired from the smart meter 52 is larger than the threshold value TH_L, the charging instruction unit 105 instructs the charging station 2 to suppress the charging operation in accordance with the power consumption. Accordingly, power consumption in the charging station 2 is suppressed. Therefore, the trip of the main breaker 51 is suppressed.

For example, when the power consumption is larger than the threshold value TH_H, the charging instruction unit 105 instructs the charging station 2 to suppress the charging operation more than when the power consumption is smaller than the threshold value TH_H. Therefore, it is possible to provide a time interval from when the power consumption exceeds the threshold value TH_L until when an instruction to suppress the charging operation is given. Therefore, when the power consumption rapidly decreases after the threshold value TH_L is exceeded, the charging instruction unit 105 does not need to issue an instruction to suppress the charging operation. Therefore, quick charging is possible. When there is no instruction authority, the charging instruction unit 105 does not instruct the charging operation.

Further, the charging instruction unit 105 may instruct a decrease in the charging speed as a suppression of the charging operation, but may instruct a stop of the charging operation. In this case, the power consumption is more effectively reduced than in the case where the charging instruction unit 105 instructs a decrease in the charging speed.

The power consumption acquisition unit 106 is an example of an acquisition unit. The power consumption acquisition unit 106 acquires power consumption as digital information from the smart meter 52 via the B-route port 14. The power consumption acquisition unit 106 notifies the instruction authority management unit 104, the electric device control unit 108, and the charging instruction unit 105 of the power consumption via the operation management unit 100. Note that the power consumption acquisition unit 106 is not limited to the smart meter 52. For example, the power consumed may be acquired from a power measuring instrument (not shown) connected to L #n from the wire L #1 of the distribution board 50.

The instruction authority management unit 104 is an example of a management unit and a first management unit. When the power consumed is equal to or less than the threshold value TH_L, the instruction authority management unit 104 gives the instruction authority to the child aggregator 4b. When the power consumed is larger than the threshold value TH_L, the instruction authority management unit 104 acquires the instruction authority from the child aggregator 4b and provides the instruction authority to the charging instruction unit 105. Specifically, the instruction authority management unit 104 transmits and receives a message to and from the child aggregator 4b to control whether or not there is an instruction authority.

When the instruction authority management unit 104 gives the instruction authority to the child aggregator 4b, the instruction authority management unit 104 causes the child aggregator 4b via WAN port 15 to change the value of the variable to a value indicating "authorized". Furthermore, the instruction authority management unit 104 causes the charging instruction unit 105 to change the value of the variable to a value indicating "no authority". When the instruction authority management unit 104 gives the instruction authority to the charging instruction unit 105, the instruction authority management unit 104 causes the charging instruction unit 105 to change the value of the variable to a value indicating "authorized". Further, the instruction authority management unit 104 causes the child aggregator 4b via WAN port 15 to change the value of the variable to a value indicating "no authority".

The threshold value setting unit 107 is an example of a setting unit, and sets thresholds TH_L and TH_H. The threshold value setting unit 107 sets the thresholds TH_L and TH_H based on the capacitance of the main breaker 51 received by the user IF unit 101. Therefore, appropriate threshold values TH_L and TH_H are set in accordance with the capacity of the main breaker 51 of the consumer house H.

The threshold value setting unit 107 further sets the threshold value TH_L based on the power consumption DB 131. The power consumption acquisition unit 106 monitors a time change in the power consumption acquired from the smart meter 52. The threshold value setting unit 107 generates a power consumption DB 131 based on the monitoring result. In the power consumption DB 131, for example, the sudden power consumption of the other electric device 6 is registered for each time zone. The method of setting the threshold value TH_L will be described later.

The electric device control unit 108 is an example of a control unit. The electric device control unit 108 controls the output of the electric device 6 according to the scheduled use time of the electric device 6 in the setting information 130, for example. Here, the electric device control unit 108 may control a part of the plurality of electric devices 6 or may control all of the electric devices 6.

When the power consumption acquired from the smart meter 52 is larger than the threshold value TH_L, the electric device control unit 108 reduces the output of the electric device 6 in accordance with the power consumption. For example, when the electric device 6 is an air conditioner, the electric device control unit 108 adjusts the set temperature so that the power consumption of the air conditioner decreases. As a result, the power consumption of the air conditioner is reduced, and thus the trip of the main breaker 51 is suppressed more effectively.

For example, when the power consumption is greater than the threshold value TH_H, the electric device control unit 108 reduces the power consumption of the electric device 6 than when the power consumption is less than or equal to the threshold value TH_H. Therefore, it is possible to provide a time interval from when the power consumption exceeds the threshold value TH_L until the output of the electric device 6 is reduced. Therefore, when the power consumption rapidly decreases after the threshold value TH_L is exceeded, the electric device control unit 108 does not need to reduce the output of the electric device 6.

Configuring Child Aggregators

Figure 4:
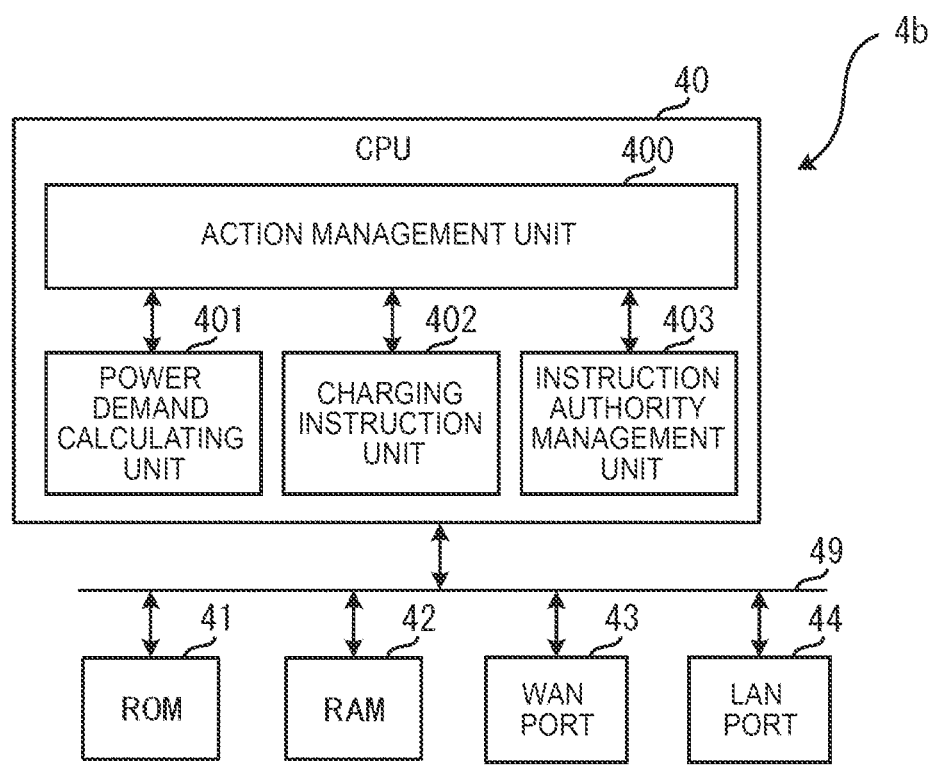
FIG. 4 is a configuration diagram illustrating an example of a child aggregator.

FIG. 4 is a configuration diagram illustrating an exemplary child aggregator 4b. The child aggregator 4b has a CPU 40, ROM 41, RAM 42, WAN port 43 and a LAN port 44. CPU 40 is electrically connected to ROM 41, RAM 42, WAN port 43 and LAN port 44 via a buss 49 so as to be able to input and output signals to and from each other.

ROM 41 stores a program for driving CPU 40. RAM 42 functions as a working memory of CPU 40. WAN port 43 and LAN port 44 include communication process circuitry and the like. LAN port 44 handles communication with the parent aggregator 4a and WAN port 43 handles communication with HEMS-GW 1.

When a program is read from ROM 41, CPU 40 forms an operation management unit 400, a power demand calculation unit 401, a charging instruction unit 402, and an instruction authority management unit 403 as software functions. The operation management unit 400 controls the operations of the power demand calculation unit 401, the charging instruction unit 402, and the instruction authority management unit 403 based on a predetermined sequence. The power demand calculation unit 401 calculates the total power demand from the predicted value of the power demand received from the consumer house H via WAN port 43.

The charging instruction unit 402 is an example of a second instruction unit. The charging instruction unit 402 receives a request for increasing the power demand from the power company system 92 via LAN port 44. The charging instruction unit 402 generates a charging instruction in response to a request for an increase in power demand. The charging instruction unit 402 transmits the generated charging instruction to HEMS-GW 1 via WAN port 43 based on the instruction authority. That is, the charging instruction unit 402 instructs the charging station 2 to perform charging via HEMS-GW 1 based on the instruction authority. If there is no instruction authority, the charging instruction unit 402 does not transmit the charging instruction even if it receives a request for an increase in power demand.

The instruction authority management unit 403 is an example of a second management unit. The instruction authority management unit 403 transmits and receives messages to and from the instruction authority management unit 104 of HEMS-GW 1 via WAN port 43, as shown in the above-described communication sequence. Thus, the instruction authority management unit 403 manages the instruction authority. The instruction authority management unit 403 acquires the instruction authority from the instruction authority management unit 104 of HEMS-GW 1 and provides the instruction authority to the charging instruction unit 402. The instruction authority management unit 403 provides the instruction authority to the instruction authority management unit 104 in response to a request from the instruction authority management unit 104.

HEMS-GW and Child Aggregator Operations

Next, the operation of HEMS-GW 1 and the child aggregator 4b will be described. The following operation is an example of a control method.

Figure 5:
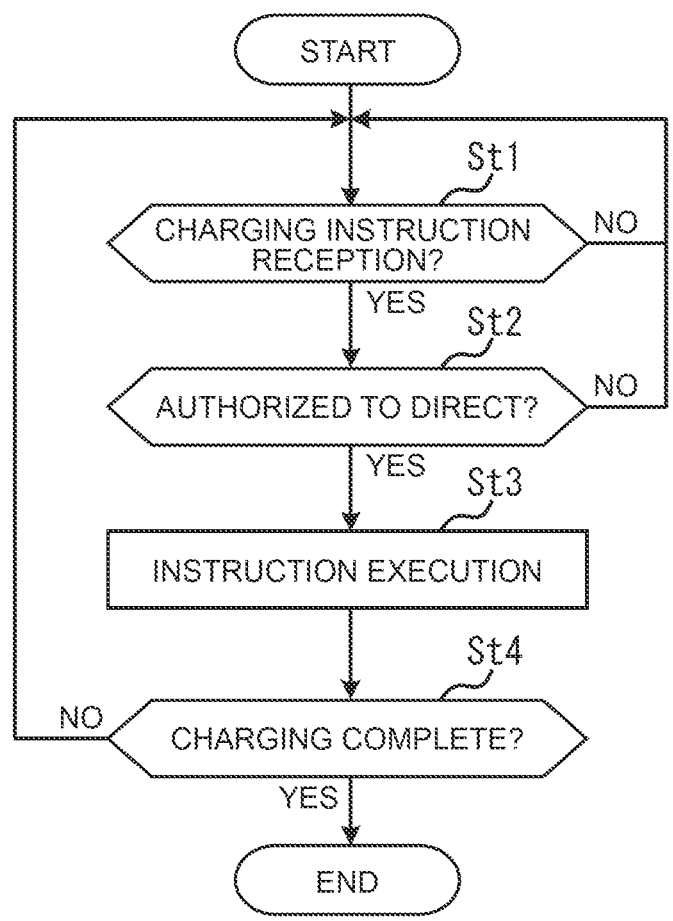
FIG. 5 is a flow chart illustrating an exemplary operation of the instruction reception processing unit of HEMS gateway.

FIG. 5 is a flowchart illustrating an exemplary operation of the instruction reception processing unit 103 of HEMS-GW 1. First, the instruction reception processing unit 103 determines whether or not a charge instruction has been received from the child aggregator 4b (SU). When the charge instruction has not been received (No of St1), St1 process is executed again.

When the charge instruction is received (Yes in St1), the instruction reception processing unit 103 confirms whether or not the instruction authority of the child aggregator 4b is present to the instruction authority management unit 104 (St2). If the child aggregator 4b does not have the instruction authority (No of St2), St1 process is executed again.

If the child aggregator 4b has instruction authority (St2: Yes), the instruction reception processing unit 103 executes an instruction to charge the child aggregator 4b to the charging station 2 (St3). That is, the child aggregator 4b instructs the charging station 2 to perform charging via HEMS-GW 1 based on the instruction authority.

Next, the instruction reception processing unit 103 determines whether or not the charge has been completed (St4). Here, the instruction reception processing unit 103 acquires State of Charge (SOC of the battery 30) from the charging station 2 to confirm the progress of the charging.

When the charge is not completed (No of St4), St1 process is executed again. When the charge is completed (Yes of St4), the process ends. In this way, the instruction reception processing unit 103 operates.

Figure 6:
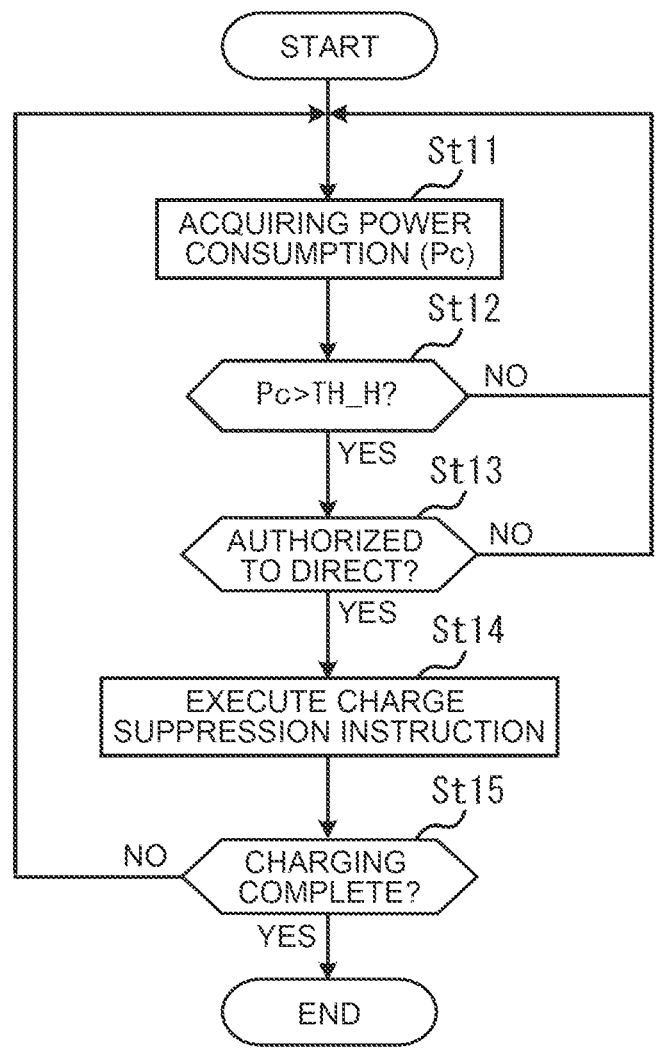
FIG. 6 is a flow chart illustrating an exemplary operation of the charging instruction unit of HEMS gateway.

FIG. 6 is a flow chart illustrating an exemplary operation of the charging instruction unit 105 of HEMS-GW 1. First, the power consumption acquisition unit 106 acquires power consumption Pc of the charging station 2 and the electric devices 6 from the smart meter 52 (St11).

Next, the charging instruction unit 105 compares the power consumption Pc with the thresholds TH_H (St12). When Pc≤TH_H is satisfied (No of St12), St11 process is executed again. When Pc>TH_H is satisfied (Yes of St12), the charging instruction unit 105 confirms whether or not the user has the instruction authority (St13). If the instruction is not authorized (No of St13), Sa1 process is executed again.

When the instruction authority is available (Yes in St13), the charging instruction unit 105 executes an instruction to suppress the charging operation to the charging station 2 (St14). Specifically, the charging instruction unit 105 instructs the charge rate to be lower than the charge operation instructed by the child aggregator 4b. At this time, the charging instruction unit 105 may instruct to stop the charging operation. In this case, the trip of the main breaker 51 can be suppressed more reliably than in the case where the charging speed is simply reduced.

Next, the charging instruction unit 105 determines whether or not charging has been completed (St15). Here, the charging instruction unit 105 acquires SOC of the battery 30 from the charging station 2 to confirm the progress of the charging.

When the charge is not completed (No of St15), Sa1 process is executed again. When the charge is completed (Yes of St15), the process ends. In this way, the charging instruction unit 105 operates.

Figure 7:
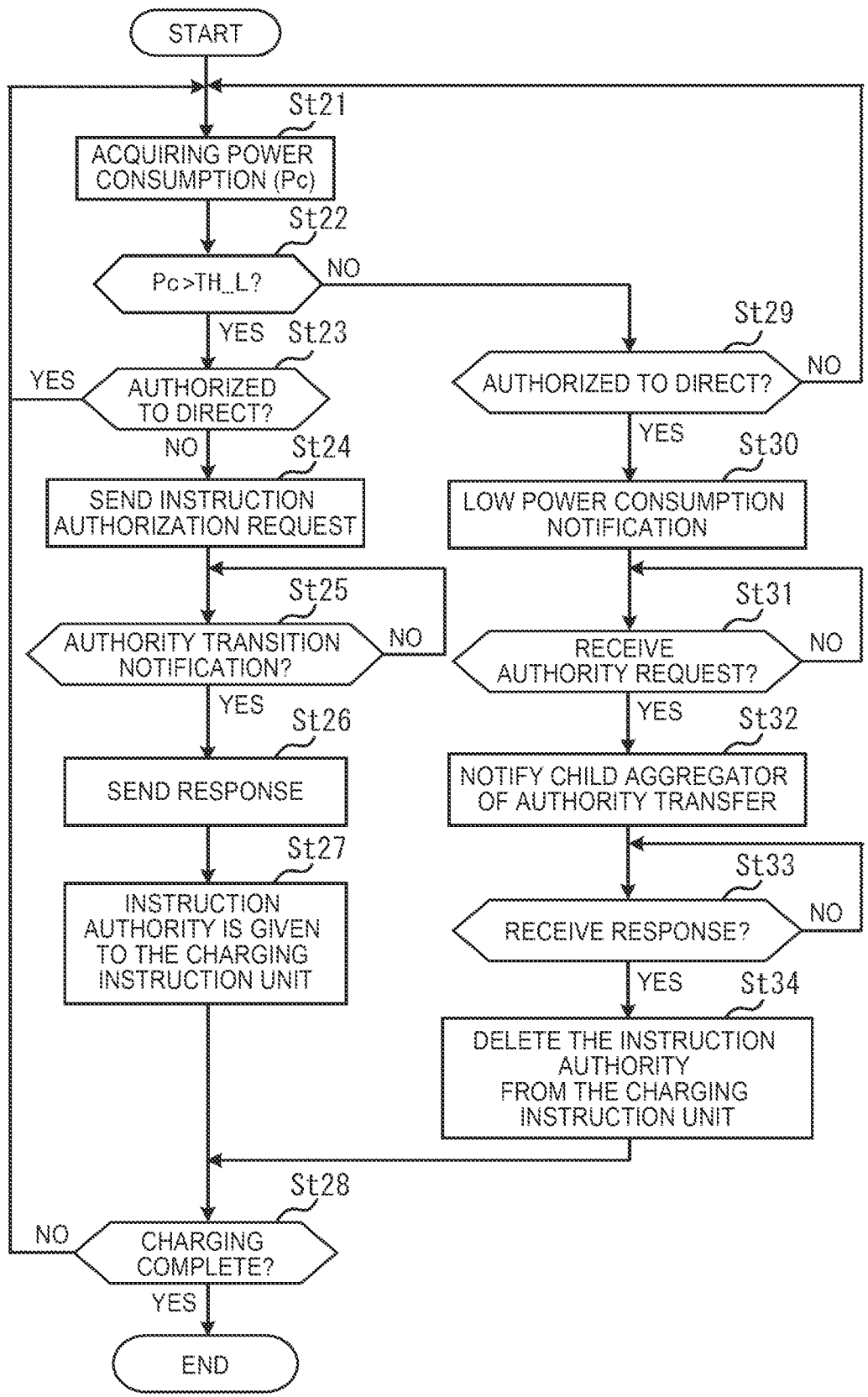
FIG. 7 is a flow chart illustrating an exemplary operation of the instruction authority management unit of HEMS gateway.

FIG. 7 is a flow chart illustrating an exemplary operation of the instruction authority management unit 104 of HEMS-GW 1. First, the power consumption acquisition unit 106 acquires power consumption Pc of the charging station 2 and the electric devices 6 connected to the distribution board 50 from the smart meter 52 (St21).

Next, the instruction authority management unit 104 compares power consumption Pc with the thresholds TH_L (St22). When Pc>TH_L is satisfied (Yes of St22), the instruction authority management unit 104 checks whether or not the instruction authority of the charging instruction unit 105 is present (St23). If there is an instruction authority (Yes of St23), St21 process is executed again. If there is no instruction authority (No of St23), the instruction authority management unit 104 transmits an instruction authority request to the child aggregator 4b (St24).

Next, the instruction authority management unit 104 determines whether or not a transition notification of the instruction authority has been received from the child aggregator 4b (St25). When the transition notification is not received (No of St25), St25 process is executed again. When the transition notification is received (Yes of St25), the instruction authority management unit 104 transmits a reply to the child aggregator 4b (St26).

Next, the instruction authority management unit 104 assigns the instruction authority to the charging instruction unit 105 (St27). For example, the instruction authority management unit 104 changes the variable indicating the presence or absence of the instruction authority from the value indicating the absence of the instruction authority to the value indicating the presence or absence of the instruction authority.

Next, the instruction authority management unit 104 determines whether or not the charge has been completed (St28). Here, the instruction authority management unit 104 acquires SOC of the battery 30 from the charging station 2 to confirm the progress of the charging.

When the charge is not completed (No of St28), St21 process is executed again. When the charge is completed (Yes of St28), the process ends.

When Pc≤TH_L is satisfied (No of St22), the instruction authority management unit 104 checks whether or not the instruction authority of the charging instruction unit 105 is present (St29). If the instruction is not authorized (No of St29), St21 process is executed again. If there is an instruction authority (Yes of St29), the instruction authority management unit 104 transmits a notification of power dissipation to the child aggregator 4b (St30).

Next, the instruction authority management unit 104 determines whether or not a request for the instruction authority has been received from the child aggregator 4b (St31). If no St31 has been received (No in St31), the process is executed again.

When the instruction is received (Yes in St31), the instruction authority management unit 104 transmits an instruction authority transition notification to the child aggregator 4b (St32). Next, the instruction authority management unit 104 determines whether or not a reply to the transition notification has been received from the child aggregator 4b (St33). If a reply is not received (No of St33), St33 process is executed again.

If a reply has been received (Yes of St33), the instruction authority management unit 104 deletes the instruction authority from the charging instruction unit 105 (St34). For example, the instruction authority management unit 104 changes a variable indicating the presence or absence of the instruction authority from a value indicating the presence or absence of the instruction authority to a value indicating the absence of the instruction authority. Thereafter, St28 process is executed. In this way, the instruction authority management unit 104 operates.

Figure 8:
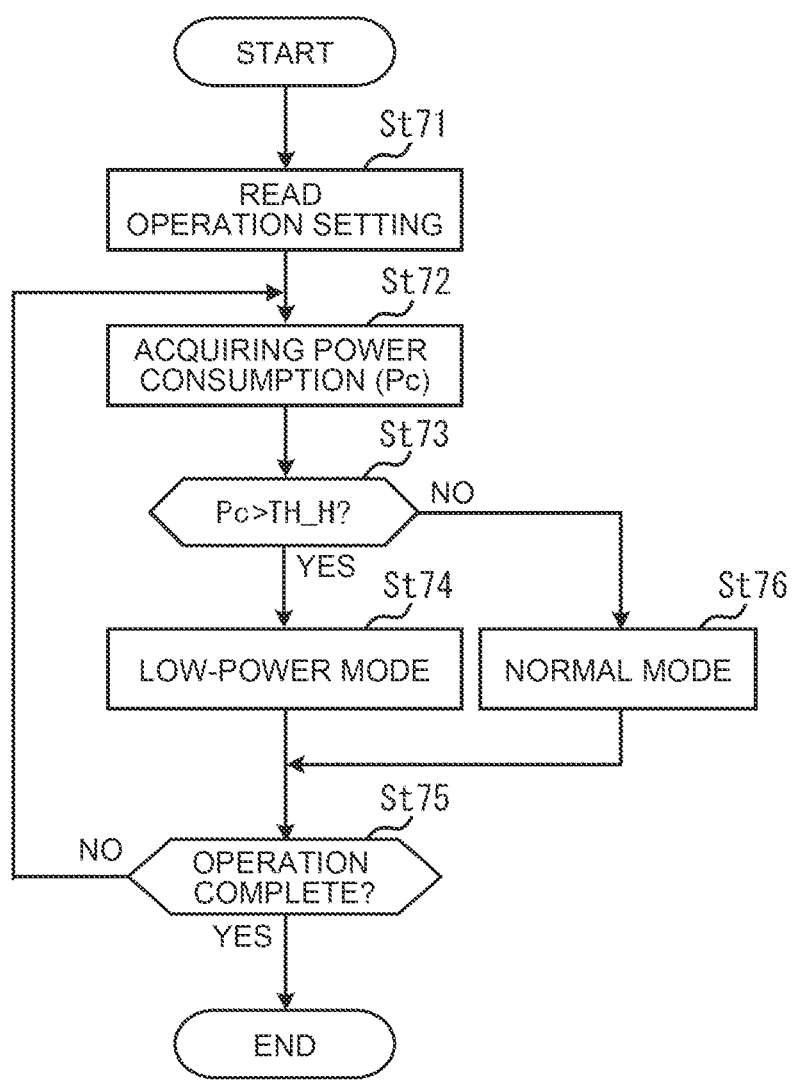
FIG. 8 is a flowchart illustrating an example of an operation of the electric device control unit.

FIG. 8 is a flowchart illustrating an example of the operation of the electric device control unit 108. First, the electric device control unit 108 reads out the operation setting such as the use starting time of the electric device 6 from the setting information 130 (St71). Next, the power consumption acquisition unit 106 acquires power consumption Pc of the charging station 2 and the electric device 6 from the smart meter 52 (St72).

Next, the electric device control unit 108 compares the power consumption Pc with the thresholds TH_H (St73). When Pc>TH_H is satisfied (Yes of St73), the electric device control unit 108 controls the output of the electric device 6 in the low-power-consumption mode based on the operation setting (St74), and when Pc TH_H is satisfied (No of St73), controls the output of the electric device 6 in the normal mode based on the operation setting (St76). In the low power consumption mode, the power consumption of the electric device 6 is suppressed more than in the normal mode. As a result, the trip of the main breaker 51 is suppressed more effectively than in the case where only the charging operation of the charging station 2 is suppressed.

Next, the electric device control unit 108 determines whether or not the operation of the electric device 6 is completed based on the operation setting (St75). At this time, the electric device control unit 108 determines the completion of the operation based on, for example, the scheduled end time of use of the electric device 6. When the operation of the electric device 6 is completed (Yes in St75), the present process ends, and when the operation of the electric device 6 is not completed (No in St75), the processes after St72 are executed again.

Figure 9:
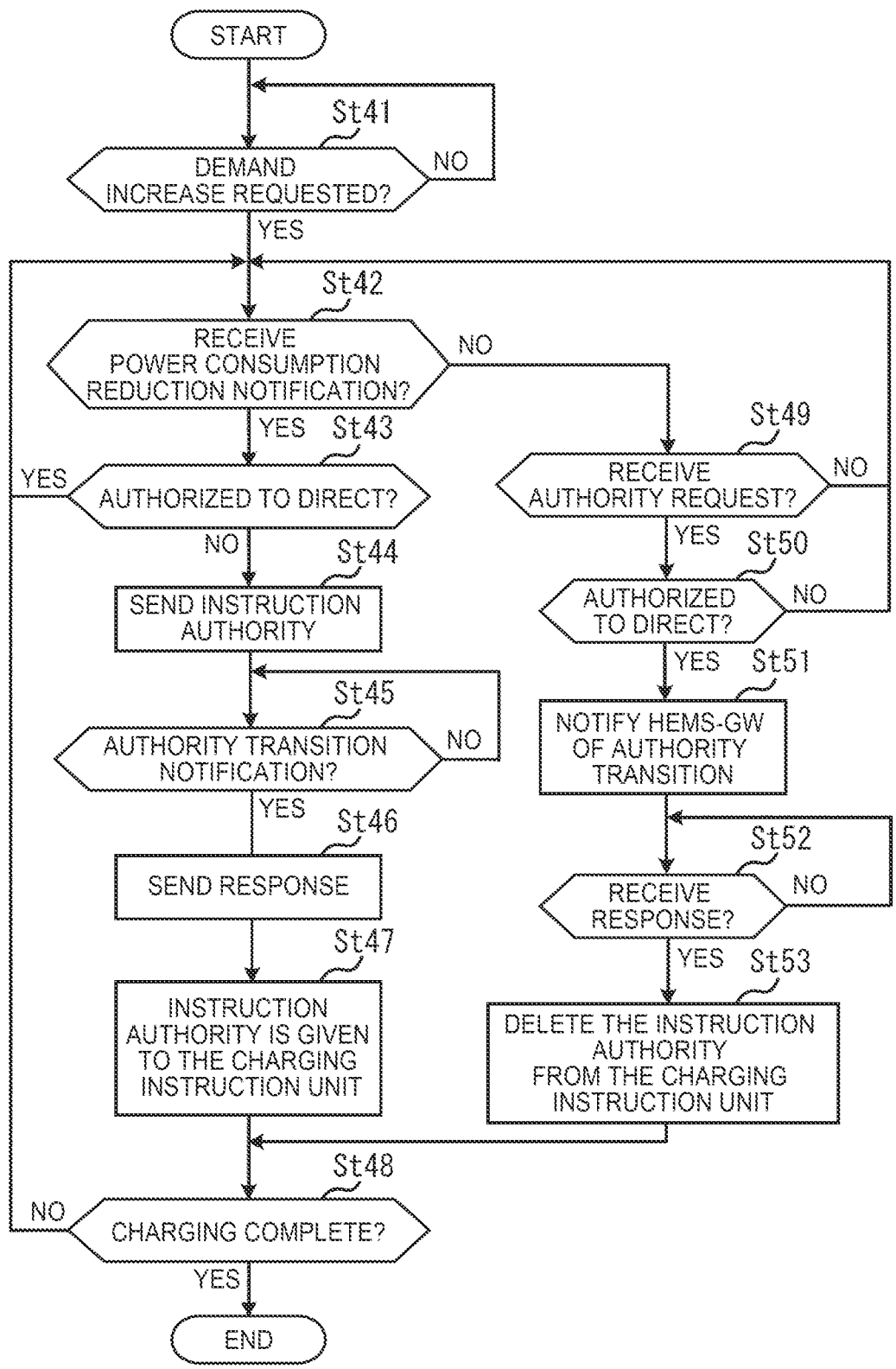
FIG. 9 is a flowchart illustrating an example of an operation of the instruction authority management unit of the child aggregator.

FIG. 9 is a flow chart illustrating an exemplary operation of the instruction authority management unit 403 of the child aggregator 4*b*. First, the instruction authority management unit 403 determines whether or not there is a request for increasing demand from the power company system 92 (St41). If there is no request (No of St41), St41 process is executed again.

If there is a request (Yes in St41), the instruction authority management unit 403 determines whether or not a notification of power consumption reduction has been received from HEMS-GW 1 (St42). When the notification is received (Yes in St42), the instruction authority management unit 403 checks whether or not the instruction authority of the charging instruction unit 402 is present (St43). If there is an instruction authority (Yes of St43), St42 process is executed again. If there is no instruction authority (No of St43), the instruction authority management unit 403 transmits a request for the instruction authority to HEMS-GW 1 (St44).

Next, the instruction authority management unit 403 determines whether or not a transition notification of the instruction authority has been received from HEMS-GW 1 (St45). When the transition notification is not received (No of St45), St45 process is executed again. When the migration notification is received (Yes in St45), the instruction authority management unit 403 transmits a reply to the migration notification to HEMS-GW 1 (St46).

Next, the instruction authority management unit 403 assigns the instruction authority to the charging instruction unit 402 (St47). For example, the instruction authority management unit 403 changes the variable indicating the presence or absence of the instruction authority from the value indicating the absence of the instruction authority to the value indicating the presence or absence of the instruction authority.

Next, the instruction authority management unit 403 determines whether or not the charge has been completed (St48). Here, the instruction authority management unit 403 acquires SOC of the battery 30 from the charging station 2 to confirm the progress of the charging.

When the charge is not completed (No of St48), St42 process is executed again. When the charge is completed (Yes of St48), the process ends.

If the notification has not been received (No in St42), the instruction authority management unit 403 determines whether or not a request for the instruction authority has been received from HEMS-GW 1 (St49). If the request is not received (No in St49), St42 process is executed again. When the request is received (Yes in St49), the instruction authority management unit 403 checks whether or not the instruction authority of the charging instruction unit 402 is present (St50). If the instruction is not authorized (No of St50), St42 process is executed again. If there is an instruction authority (Yes of St50), the instruction authority management unit 403 transmits a transition notification of the instruction authority to HEMS-GW 1 (St51).

Next, the instruction authority management unit 403 determines whether or not a reply to the transition notification has been received from HEMS-GW 1 (St52). If a reply is not received (No of St52), St52 process is executed again.

If a reply has been received (Yes in St52), the instruction authority management unit 403 deletes the instruction authority from the charging instruction unit 402 (St53). For example, the instruction authority management unit 403 changes a variable indicating the presence or absence of the instruction authority from a value indicating the presence or absence of the instruction authority to a value indicating the absence of the instruction authority. Thereafter, St48 process is executed. In this way, the instruction authority management unit 403 operates.

As described above, the instruction authority management unit 403 acquires the instruction authority from the instruction authority management unit 104 of HEMS-GW 1, gives the instruction authority to the charging instruction unit 402, and gives the instruction authority to the instruction authority management unit 104 in response to a request from the instruction authority management unit 104.

Figure 10:
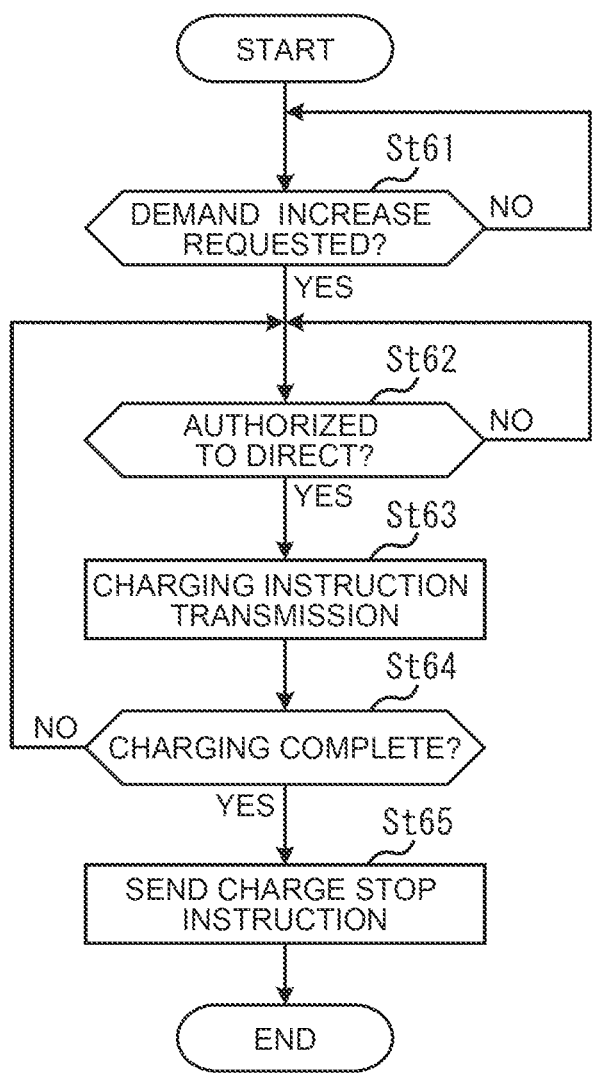
FIG. 10 is a flowchart illustrating an example of the operation of the charging instruction unit of the child aggregator.

FIG. 10 is a flow chart illustrating an exemplary operation of the charging instruction unit 402 of the child aggregator 4*b*. First, the charging instruction unit 402 determines whether or not there is a request for increasing the power demand from the power company system 92 (St61). If there is no request (No of St61), St61 process is executed again.

When there is a request (Yes of St61), the charging instruction unit 402 confirms the presence or absence of the right to instruct itself (St62). If the instruction is not authorized (No of St62), St62 process is executed again. If there is an instruction authority (Yes of St62), a charge instruction is sent to HEMS-GW 1 based on the instruction authority (St63).

Next, the charging instruction unit 402 determines whether or not charging has been completed (St64). Here, the charging instruction unit 402 acquires SOC of the battery 30 from the charging station 2 to confirm the progress of the charging.

When the charge is not completed (No of St64), St62 process is executed again. When charging is completed (Yes of St64), the charging instruction unit 402 transmits a charging stopping instruction to HEMS-GW 1 (St65). Thereafter, the process ends. In this way, the charging instruction unit 402 operates.

Figure 11:
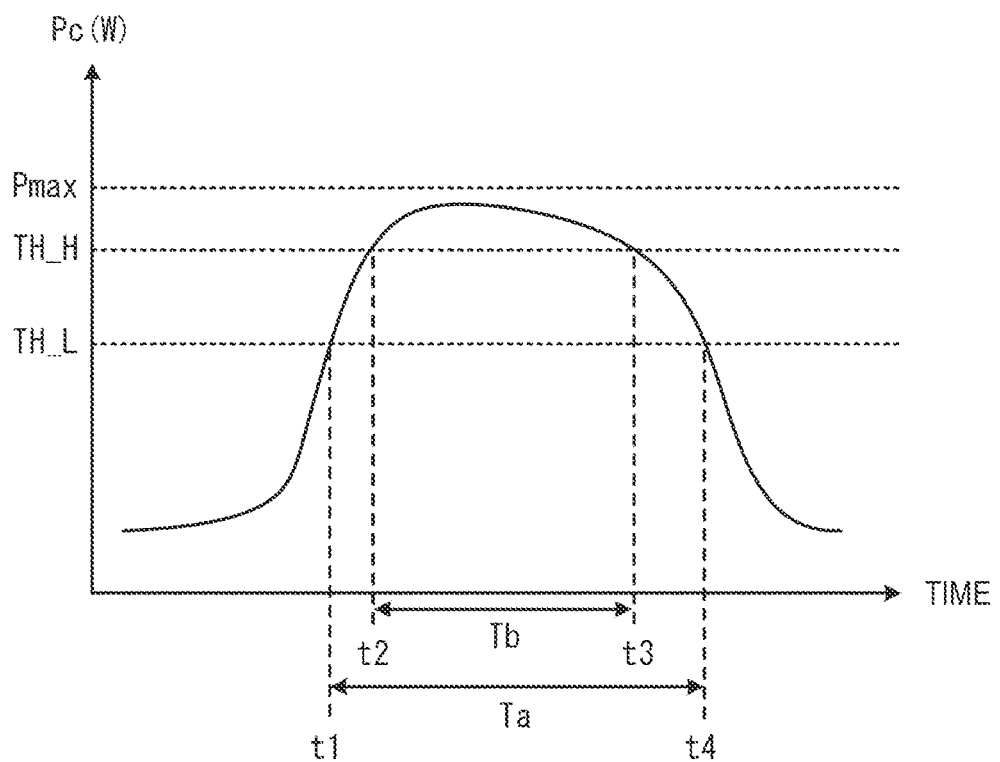
FIG. 11 is a diagram illustrating an example of a change in power consumption with respect to time.

FIG. 11 is a diagram illustrating an exemplary change in power consumption Pc with respect to time. The upper limit power Pmax corresponds to the capacitance of the main breaker 51.

The power consumption Pc exceeds the threshold value TH_L at time t1 and thereafter exceeds the threshold value TH_H at time t2. In the time t1, HEMS-GW 1 acquires the instruction authority for the charging operation from the child aggregator 4b. Therefore, HEMS-GW 1 can acquire the instruction authority in advance in preparation for when the power consumption Pc exceeds the threshold value TH_H and approaches the upper limit power Pmax.

In the time t2, HEMS-GW 1 instructs to suppress the charge operation. Therefore, an increase in the power consumption Pc is suppressed, and the power consumption Pc starts to decrease. The power consumption Pc falls below the threshold value TH_H at the time t3 and falls below the threshold value TH_L at the time t4. This causes HEMS-GW 1 to return the indication authority to the child aggregator 4b.

As described above, HEMS-GW 1 has the instruction authority in place of the child aggregator 4b in the period Ta from the time t1 to t4. HEMS-GW 1 suppresses the charging operation in the period Tb of t3 from the time t2 at which the power consumption Pc reaches the upper limit power Pmax and the main breaker 51 may trip during the period Ta. This makes it possible to suppress the tripping of the main breaker 51.

Threshold Setting Method

Figure 12:
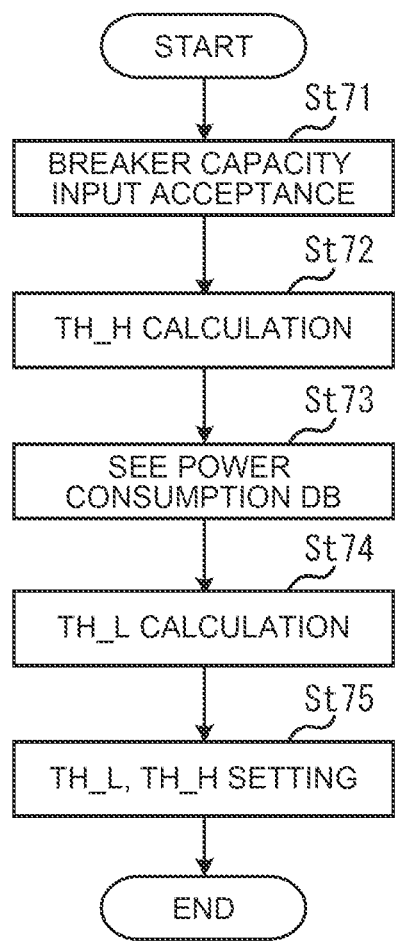
FIG. 12 is a flowchart illustrating an example of threshold setting processing.

FIG. 12 is a flowchart illustrating an example of a setting process of the threshold values TH_L and TH_H. This process is executed, for example, by the user in accordance with the operation of the terminal 7 before the charging station 2 is instructed to perform the charging operation.

First, the user IF unit 101 receives the capacitance of the main breaker 51 from the terminal 7 of the user (St71). Next, the threshold value setting unit 107 calculates the threshold value TH_H based on the capacitance of the main breaker 51 (St72). The threshold value TH_H is calculated by subtracting, from the capacity of the main breaker 51, a margin in consideration of, for example, an error in the amount of charge in an instruction of the charging operation of the charging station 2.

Next, the threshold value setting unit 107 refers to the power consumption DB 131 (St73). In the power consumption DB 131, the sudden power consumption of the electric device 6 for each time zone is registered on the basis of the monitoring of the time change of the power consumption Pc of the charging station 2 and the electric device 6 to which the distribution board 50 distributes power.

Next, the threshold value setting unit 107 calculates the threshold value TH_L from the difference between the sudden power consumed by the electric device 6 and the capacitance of the main breaker 51 for each time zone (St74). Therefore, an appropriate threshold value TH_L is calculated according to the power consumption for each time zone.

Next, the threshold value setting unit 107 sets the threshold values TH_L and TH_H to the instruction authority management unit 104 and the charging instruction unit 105 (St75). The instruction authority management unit 104 switches the value of the threshold value TH_L according to the time period. Therefore, the instruction authority management unit 104 can give the instruction authority to the charging instruction unit 105 in a timely manner in accordance with a change in power consumption in each time zone.

As described above, the threshold value setting unit 107 changes the threshold value TH_L according to the time based on the monitoring result of the time change of the power consumption Pc. Therefore, the threshold value setting unit 107 can manage the dynamic instruction authority.

Figure 13:
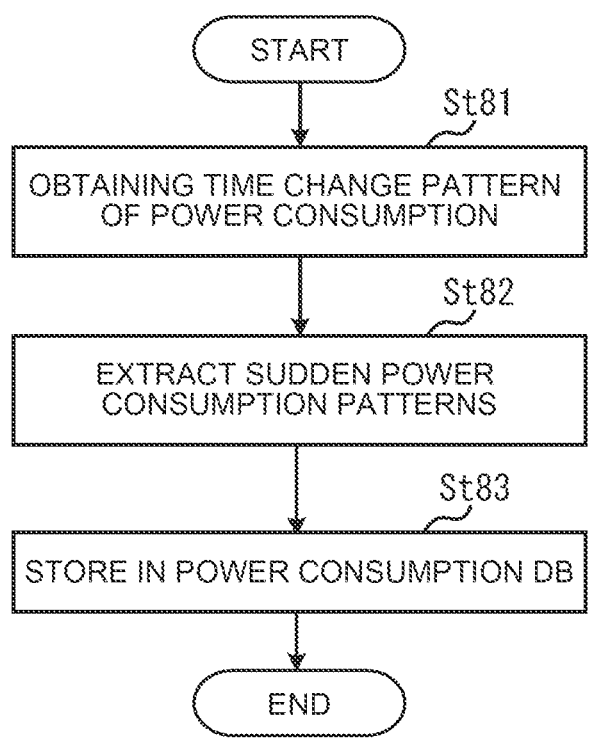
FIG. 13 is a flowchart illustrating an example of a power consumption database generation process.

FIG. 13 is a flow chart illustrating an exemplary process of generating a power consumption DB 131. This process is executed before the setting of the threshold value TH_L.

First, the power consumption acquisition unit 106 acquires the time change pattern of the power consumption Pc measured by the smart meter 52 (St81). Next, the threshold value setting unit 107 extracts a sudden power consumption pattern from the time change pattern of the power consumption Pc (St82). The extraction method will be described later. Next, the threshold value setting unit 107 stores the maximum power consumption in the power consumption DB 131 from the extracted power consumption pattern (St83).

Figure 14:
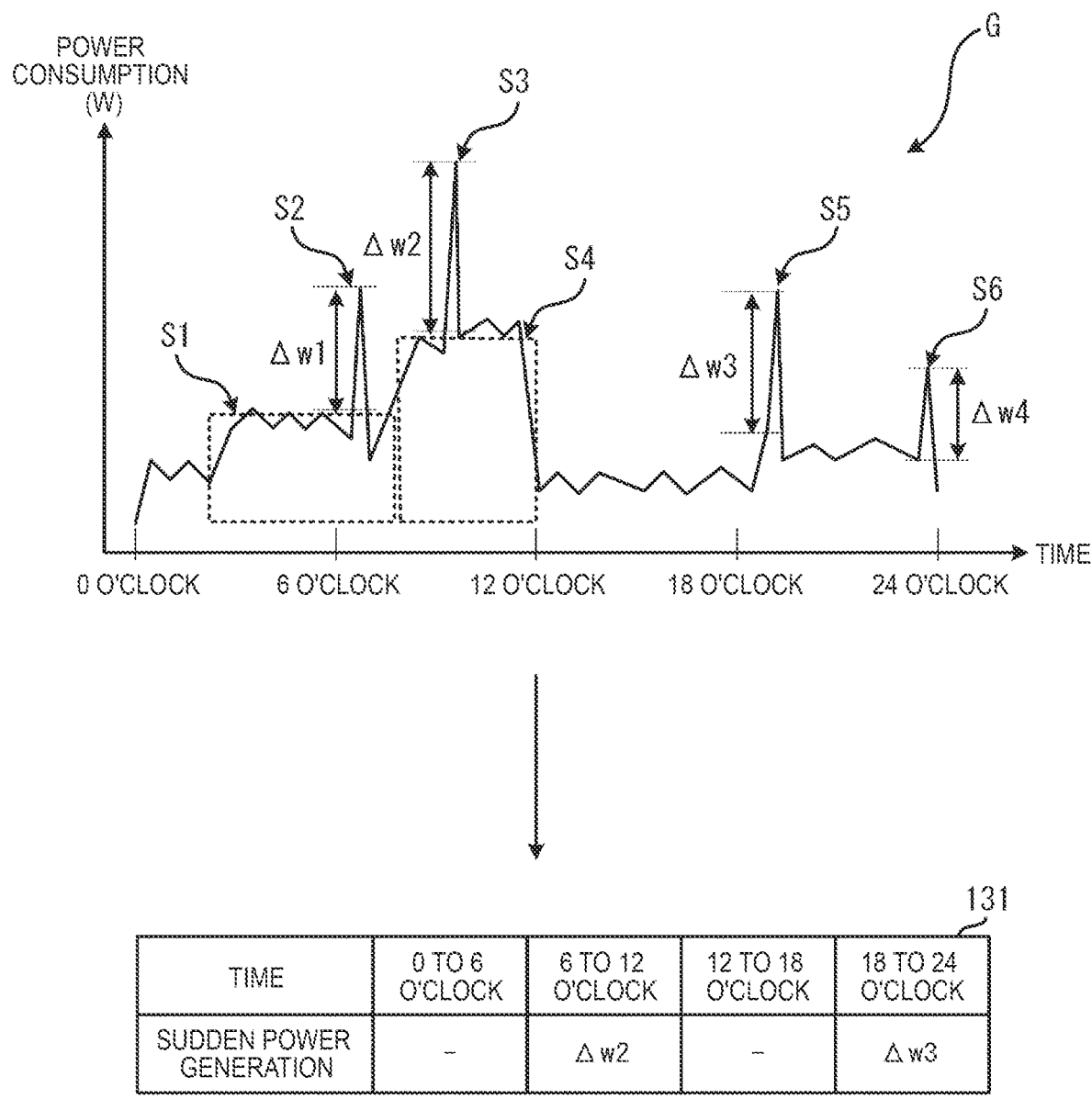
FIG. 14 is a diagram illustrating an exemplary time variation of power consumption and an exemplary power consumption data base.

FIG. 14 is a diagram illustrating an exemplary time change and power consumption DB 131 of the power consumption Pc. The reference numeral G indicates an exemplary change in power consumption Pc with respect to the time. In this example, one day is divided into time zones of 0 to 6 o'clock, 6 to 12 o'clock, 12 to 18 o'clock, and 18 to 24 o'clock.

FIG. 14 shows a power consumption pattern S2,S3 of a power consumption pattern S1, IH cooker of an electric water heater and a power consumption pattern S5,S6 of an air conditioner as an exemplary power consumption of the electric device 6. The power of the power consumption pattern S2,S3 is Δw1 and Δw2 (>Δw1), respectively. The power of the power consumption pattern S5, S6 is Δw3 and Δw4 (<Δw3), respectively. FIG. 14 also shows the power consumption pattern S4 of the charging station 2.

The threshold value setting unit 107 extracts the power consumption pattern S2,S3,S5,S6 as a sudden power consumption pattern. The sudden power consumption pattern is defined as a pattern in which power consumption of 2 (kW) or more continues for 15 minutes or less.

The threshold value setting unit 107 specifies a time zone of the power consumption pattern S2,S3,S5,S6, and registers the largest power consumption (sudden power generation) for each time zone in the power consumption DB 131. The threshold value setting unit 107 registers the maximum power consumption Δw2 in the power consumption pattern S2,S3 from 6 to 12, and registers the maximum power consumption Δw3 in the power consumption pattern S5, S6 from 18 to 24.

In this case, the threshold value setting unit 107 sets the threshold value TH_L at 6 to 12 hours to a value obtained by subtracting Δw2 from the capacity of the main breaker 51, and sets the threshold value TH_L at 18 to 24 hours to a value obtained by subtracting Δw3 from the capacity of the main breaker 51.

As described above, the threshold value setting unit 107 specifies a time period (from 6 to 12:00, from 18 to 24:00) in which the time during which the power consumption of the electric device 6 other than the charging station 2 to which the power is distributed from the distribution board 50 is maintained at a predetermined value or more is equal to or less than a predetermined value, based on the monitoring result of the time change of the power consumption Pc. The threshold value setting unit 107 sets the threshold value TH_L in accordance with the difference between the power consumption (Δw2, Δw3) of the electric device 6 and the capacity of the main breaker 51 in the specified time period. Therefore, even if sudden power consumption occurs, it is possible to appropriately set the threshold value TH_L so that the main breaker 51 does not trip.

In addition, the threshold value setting unit 107 may set only the threshold value TH_L in the time period in which the power consumption of a predetermined value or more continues for a predetermined time or more, from the sudden power consumption pattern, such as the power consumption pattern S1,S4. In addition, the threshold value setting unit 107 may set the threshold values TH_L at the time periods 0 to 6 o'clock and 12 to 18 o'clock in which the sudden power consumption pattern does not occur, based on the time averages of the power consumption Pc in the time periods.

In addition, the sudden power consumption pattern may fluctuate due to various environmental factors of the consumer house H such as the temperature. Therefore, the user may be allowed to correct the threshold value TH_L from the terminal 7. In this case, the user IF unit 101 receives the correction value of the threshold value TH_L from the terminal 7 prior to starting the charging. The threshold value setting unit 107 corrects the threshold value TH_L by the correction value.

Accordingly, the user can arbitrarily adjust the threshold value TH_L according to the environment, and can also adjust the threshold value TH_L according to, for example, the occurrence history (number of times, etc.) of the trip of the main breaker 51. Note that the power consumption acquisition unit 106 may monitor the power consumption Pc for each season. The threshold value setting unit 107 may set the threshold value TH_L for each season based on the monitoring result.

Configuration of Other Distribution Boards

Figure 15:
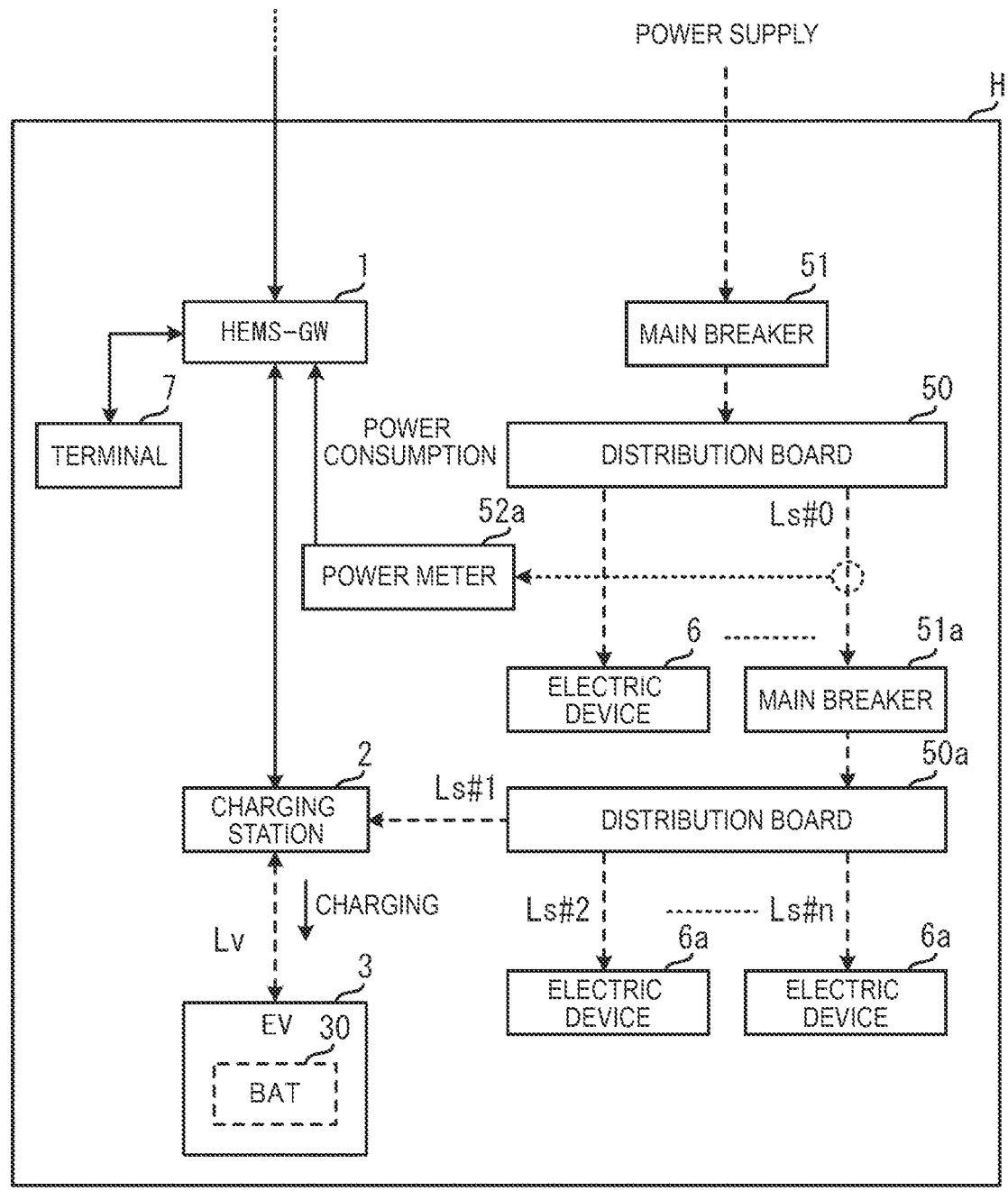
FIG. 15 is a configuration diagram illustrating an example of a consumer house provided with two distribution boards.

FIG. 15 is a configuration diagram illustrating an exemplary consumer house H provided with two distribution board 50,50a. In FIG. 15, the same components as those in FIG. 1 are denoted by the same reference numerals, and description thereof is omitted.

The distribution board 50 distributes electric power to the electric device 6 and other distribution board 50a. The wire Ls #0 of the distribution board 50 is connected to another distribution board 50a. The distribution board 50a distributes electric power to the charging station 2 and the electric device 6a. The distribution board 50a is provided with a main breaker 51a. When the power consumption Pc of the charging station 2 and the electric device 6a under the distribution board 50a exceeds the capacitance of the main breaker 51a, the main breaker 51a trips.

In this configuration, HEMS-GW 1 suppresses the tripping of the other main breaker 51a instead of the main breaker 51. Therefore, HEMS-GW 1 acquires the power consumption Pc of the charging station 2 and the electric device 6a under the distribution board 50a from the power measuring instrument 52a connected to the wire Ls #0. The power measuring instrument 52a measures the power consumption Pc from the wire Ls #0. Note that the power measuring instrument 52a may be measured from Ls #n from the wiring Ls #1 between the distribution board 50a, the charging station 2, and the other electric device 6a, instead of the wiring Ls #0.

In the present embodiment, the charging target of the charging station 2 is BEV 3 battery 30, but is not limited thereto. BEV 3 may be, for example, a stationary storage battery or the like to be charged. Further, in the present embodiment, an HEMS-GW 1 is given as an example of the control device, but the present disclosure is not limited thereto. HEMS-GW 1 may also apply the techniques described above to other control devices, such as Building Energy Management System (BEMS) gateways, installed in buildings and the like.

The above-described embodiments are preferred embodiments of the present disclosure. However, the present disclosure is not limited thereto, and various modifications can be made without departing from the gist of the present disclosure.

What is claimed is:

1. A control device comprising at least one processor configured to:
    acquire power consumption of a charger and one or more electric devices to which power is distributed from a distribution board;
    instruct to a locally present home energy management system (HEMS) gateway to perform, based on an instruction authority of a charging operation to the charger, suppression of the charging operation of the charger according to the power consumption;
    grant the instruction authority to a central power management device that manages power demand using the charger, when the power consumption is equal to or less than a first threshold value;
    grant the instruction authority to the HEMS gateway when the power consumption is greater than the first threshold value;
    receive input of capacity of a main breaker of the distribution board from a user;
    monitor a time change of the power consumption; and
    set the first threshold value based on a monitoring result of the time change of the power consumption and the capacity of the main breaker, wherein the first threshold value is set in accordance with a time based on the monitoring result of the time change of the power consumption.

2. The control device according to claim 1, wherein the at least one processor is configured to instruct the charger to further suppress the charging operation when the power consumption is greater than a second threshold value that is greater than the first threshold value than when the power consumption is equal to or less than the second threshold value.

3. The control device according to claim 1, wherein the at least one processor is configured to instruct the charger to stop the charging operation according to the power consumption.

4. The control device according to claim 1, wherein the at least one processor is configured to acquire the power consumption from a wire of the distribution board.

5. The control device according to claim 1, the at least one processor is configured to control power of the one or more electric devices according to the power consumption, when the power consumption is greater than the first threshold value.

6. The control device according to claim 1, wherein the at least one processor is configured to:
    specify, from the monitoring result of the time change of the power consumption, a time period in which a time at which power consumption of any one of the one or more electric devices is maintained to a predetermined value or more is equal to or less a fixed value, and
    set the first threshold value according to a difference between the capacity of the main breaker and power consumption of an electric device in which the time at which the power consumption is maintained to the predetermined value or more is equal to or less than the fixed value, among the one or more electric devices, in the time period.

7. The control device according to claim 6, wherein the at least one processor is configured to:
   receive an input of a correction value of the first threshold value; and
   correct the first threshold value by the correction value.

8. The control device according to claim 1, wherein the charger charges a battery mounted on a vehicle.

9. The control device according to claim 1, wherein the power management device increases power demand of a power grid to be supplied to the distribution board by instructing the charger to perform the charging operation.

* * * * *